United States Patent
Laughton et al.

(10) Patent No.: US 10,437,750 B2
(45) Date of Patent: Oct. 8, 2019

(54) RELATIVE DATA WIDTH INDICATION FOR READ RESPONSES ROUTED BY AN INTERCONNECT

(71) Applicant: Arm Limited, Cambridge (GB)

(72) Inventors: Arthur Brian Laughton, Hathersage (GB); Sean James Salisbury, Appley Bridge (GB); Chiranjeev Acharya, Sheffield (GB); Eduard Vardanyan, Sheffield (GB)

(73) Assignee: ARM Limited, Cambridge (GB)

( * ) Notice: Subject to any disclaimer, the term of this patent is extended or adjusted under 35 U.S.C. 154(b) by 99 days.

(21) Appl. No.: 15/850,296

(22) Filed: Dec. 21, 2017

(65) Prior Publication Data

US 2019/0196990 A1    Jun. 27, 2019

(51) Int. Cl.
  *G06F 13/12* (2006.01)
  *G06F 13/16* (2006.01)
  *G06F 13/42* (2006.01)

(52) U.S. Cl.
  CPC ...... *G06F 13/1678* (2013.01); *G06F 13/1642* (2013.01); *G06F 13/1673* (2013.01); *G06F 13/4282* (2013.01); *G06F 2213/0026* (2013.01); *G06F 2213/4004* (2013.01)

(58) Field of Classification Search
  CPC .............................. G06F 13/4265; G06F 13/28
  USPC ........................................................ 710/307
  See application file for complete search history.

(56) References Cited

U.S. PATENT DOCUMENTS

| | | | | |
|---|---|---|---|---|
| 7,295,574 B1* | 11/2007 | Parruck | ............... | H04L 12/5601 370/474 |
| 7,982,497 B1* | 7/2011 | Trimberger | .......... | H03K 19/177 326/101 |
| 2003/0126297 A1* | 7/2003 | Olarig | ..................... | H04L 47/30 709/250 |
| 2007/0268931 A1* | 11/2007 | Shaikli | .................... | H04J 3/047 370/468 |
| 2009/0010279 A1* | 1/2009 | Tsang | ..................... | H04L 47/22 370/468 |
| 2014/0019654 A1* | 1/2014 | Trivedi | ................... | G06F 13/42 710/107 |
| 2016/0154753 A1* | 6/2016 | Gittins | ............... | G06F 13/1663 710/117 |

* cited by examiner

*Primary Examiner* — Titus Wong
(74) *Attorney, Agent, or Firm* — Nixon & Vanderhye P.C.

(57) ABSTRACT

An interconnect for providing data access between nodes of an integrated circuit, comprises a predetermined type of ingress port comprising routing circuitry responsive to a read-triggering request received from a requesting node to select from a selected egress port via which signals are to be routed to a destination node to control the destination node to return at least one read response dependent on data read from a target storage location. In response to the read-triggering request, the routing circuitry obtains a relative data width indication specifying whether read responses received at the selected egress port have a narrower data width than read responses to be provided to the requesting node by the predetermined type of ingress port, and controls allocation of resource for handling the read-triggering request or the at least one read response depending on the relative data width indication.

21 Claims, 7 Drawing Sheets

RELATIVE DATA WIDTH INDICATION FOR READ RESPONSES ROUTED BY AN INTERCONNECT

BACKGROUND

Technical Field

The present technique relates to the field of integrated circuits. More particularly it relates to an interconnect for providing data access between nodes of an integrated circuit.

Technical Background

An integrated circuit, for example a system on chip, may include a number of components which may communicate by issuing data access requests specifying a target memory address. An interconnect may be provided which manages routing of data access requests from a given requesting node of the integrated circuit to a selected destination node depending on the target address specified by the data access request. The selected destination node may provide a read or write response to the data access request which is routed back to the requesting node by the interconnect.

SUMMARY

At least some examples provide an interconnect for providing data access between nodes of an integrated circuit, comprising:
a plurality of ports, each port to exchange data with a corresponding node of the integrated circuit, wherein at least one of the ports is a predetermined type of ingress port comprising:
routing circuitry responsive to a read-triggering request received from a requesting node at the predetermined type of ingress port, to select from among the plurality of ports a selected egress port via which signals are to be routed to a destination node to control the destination node to return via the selected egress port at least one read response dependent on data read from a target storage location;
wherein in response to the read-triggering request, the routing circuitry is configured to obtain a relative data width indication specifying whether read responses received at the selected egress port have a narrower data width than read responses to be provided to the requesting node by the predetermined type of ingress port, and to control allocation of resource for handling the read-triggering request or the at least one read response depending on the relative data width indication.

At least some examples provide a method for providing data access between nodes of an integrated circuit using an interconnect comprising a plurality of ports, each port to exchange data with a corresponding node of the integrated circuit; the method comprising:
in response to a read-triggering request received from a requesting node at a predetermined type of ingress port among the plurality of ports:
selecting from among the plurality of ports a selected egress port via which signals are to be routed to a destination node to control the destination node to return via the selected egress port at least one read response dependent on data read from a target storage location;
obtaining a relative data width indication specifying whether read responses received at the selected egress port have a narrower data width than read responses to be provided to the requesting node by the predetermined type of ingress port; and
controlling allocation of resource for handling the read-triggering request or the at least one read response depending on the relative data width indication.

At least some examples provide a non-transitory storage medium storing an electronic design file representing a design of an interconnect as discussed above.

At least some examples provide a computer-implemented method of generating an electronic design file representing a design of an interconnect for providing data access between nodes of an integrated circuit;
the electronic design file defining the interconnect comprising a plurality of ports, each port to exchange data with a corresponding node of the integrated circuit;
the electronic design file indicating, for each port, a data width of read responses to be exchanged by that port with the corresponding node;
wherein the ports include at least one ingress port for receiving a read-triggering request from a requesting node and selecting from among the plurality of ports a selected egress port via which signals are to be routed to a destination node to control the destination node to return via the selected egress port at least one read response dependent on data read from a target storage location;
the method comprising, for a given ingress port:
identifying a subset of ports which can be selected as the selected egress port for read-triggering requests received at the given ingress port; and
when at least one of the subset of ports is to receive read responses having a narrower data width than read responses to be provided to the requesting node by the given ingress port:
generating at least one relative data width indication, each relative data width indication specifying, for the given ingress port and a respective one of the subset of ports, whether read responses received at the one of the subset of ports have a narrower data width than read responses to be provided to the requesting node by the given ingress port, and
generating or updating the electronic design file to indicate that the interconnect comprises storage circuitry to store the at least one relative data width indication.

At least some examples provide a non-transitory storage medium storing a computer program for controlling a data processing apparatus to perform the method of generating the electronic design file discussed above.

Further aspects, features and advantages of the present technique will be apparent from the following description of examples, which is to be read in conjunction with the accompanying drawings.

DESCRIPTION OF EXAMPLES

An interconnect may provide data access between nodes of an integrated circuit. The interconnect may have two or more ports, with each port being provided to exchange data with a corresponding node of the integrated circuit. Requests for data access may be issued by a requesting node to an ingress port of the integrated circuit. The ingress port may have routing circuitry which is responsive to a data access request received from the requesting node to select from among the ports of the interconnect which port should be a selected egress port via which signals are to be routed to a destination node to control the destination node to return a response to the data access request. Different types of data access requests could be provided, for example write requests which require a write response confirming that a write operation to write data to a target storage location has been serviced, or read requests requiring a read response which provides a value depending on data read from a target storage location. Also, other types of transaction other than reads could also require the return of a read response providing data read from a target storage location, as will be discussed below.

For a read-triggering request which requires a read response, the data width associated with the read response may vary for different egress ports of the interconnect. There may be a number of reasons why a particular egress port might receive read responses which have a narrower data width than the read responses to be provided to the requesting node by the ingress port. One reason could be that the physical data channel along which read responses are provided to the selected egress port is narrower than the physical response channel provided at the ingress port. However, even if the physical channel used for conveying read responses has the same data width for both the egress port and the ingress port, it is also possible that the selected egress port could receive narrower read responses due to properties of the downstream elements which the selected egress port communicates. For example there may be a downstream bus which has a narrower data width and the components between that bus and the selected egress port may not have any reassembly logic for combining narrower data into wider responses and so the responses received at the selected egress port could still have the narrower data width even if the physical channel at the selected egress port could support a wider data width. Also, some downstream memory components could operate with a cache line size which is narrower than the data width on the read response channel so that the memory component can only obtain part of the width of the read response channel in a single memory access and therefore may provide multiple read responses which each provide a chunk of the overall read data instead of a single combined response.

Regardless of the particular reason for the difference in read response data width, in cases where the read response received at the selected egress port in response to a read-triggering request has a narrower data width than read responses to be provided to the requesting node by the ingress port which received the original read-triggering request, this may require additional resource to be allocated for handling the read-triggering request that may not have been needed if the selected egress port receives read-responses with the same data width or a greater data width than can be provided to the requesting node via the ingress port.

At least one of the ports of the interconnect may be a predetermined type of ingress port which has routing circuitry which, in response to a read-triggering request received from a requesting node at the predetermined type of ingress port, selects the selected egress port via which signals are to be routed to a destination node to control the destination node to return at least one read response depending on data read from a target storage location. In response to the read-triggering request, the routing circuitry of the predetermined type of ingress port may obtain a relative data width indication specifying whether read responses received at the selected egress port have a narrower data width than read responses to be provided to the requesting node by the predetermined type of ingress port. The routing circuitry may control allocation of resource for handling the read-triggering request or the at least one read response depending on the relative data width indication.

Therefore, the ingress port which receives the read-triggering request is able to identify whether the selected egress port which will be used for routing the corresponding signals to the destination node will receive narrower read responses than are used by the predetermined type of ingress port. This can be useful for several reasons. Firstly, as it is known in advance whether the read responses are likely to be narrower than required for the requesting node, it is not necessary to speculatively allocate resource as a precaution in case the read response received at the selected egress port is narrower than the responses to be issued over the predetermined type of ingress port. Hence, any resource required for handling the read responses with a narrower data width can be reserved for the read-triggering requests which actually require this resource, and read-triggering requests which are routed to a selected egress port which does not receive read responses with the narrower data width can be issued even if all the resource available for handling the responses with the narrower data width have been exhausted. This enables better management of resource allocation and improved performance. Also, as it can be known in advance at the ingress port which responses do or do not require the resource for handling the responses with a narrower data width, this means that it is not necessary to explicitly compare the data width of the read responses with the width used by the predetermined type of ingress port when those read responses are subsequently received, so that any comparators for comparing the data width can be omitted to save power and circuit area and the latency associated with the path for processing read responses can be lower.

It is not necessary for each ingress port of the interconnect to be of the predetermined type which has routing circuitry able to obtain the relative data width indication. Some ingress ports may simply issue the read-triggering requests to the selected egress port without checking whether the selected egress port would receive narrower read responses than are used by the ingress port, and in this case such ingress port may still identify the data width for the read responses at the time of receiving the read response. However, by providing one or more ingress ports of the predetermined type this can help to reduce the circuit area and power consumption of the interconnect and improve performance.

The resource which is allocated for handling read-triggering requests may vary, but in one example the resource may comprise space in a read response buffer provided for storing read responses received in response to read-triggering requests. In some cases, narrower read responses could simply be passed on as received to the requesting node, without reassembling multiple responses into a combined response. In this case, the relative data width indication can be useful for indicating how many responses to expect for a given request. This may influence how much space needs to be allocated in the buffer, to avoid unnecessarily allocating too much buffer space for requests which would return a single wider response.

However, in one example the predetermined type of ingress port may have response assembly circuitry to assemble a combined response having a wider data width from two or more read responses including at least one read response stored in at least a portion of the read response buffer. When the selected egress port receives multiple read responses with a narrower data width, these may be buffered in the read response buffer while waiting for all the individual responses to the same request to be returned, and once all responses have been received, the combined response with a wider data width may be returned to the requesting node, so that the requesting node does not need to process multiple separate read responses for the same read-triggering request. The read response buffer may be used to temporarily buffer read responses when only part of the responses for a given read-triggering request have been received and other read responses for the same request are still being awaited due to the use of the narrower data width. In one example multiple entries of the buffer may be allocated for the same request to handle each read response and then when they have all been received they may be merged together. However, a more efficient approach can be to allocate a single buffer entry to a read-triggering request for which the relative data width indication specified that the selected egress port used the narrower data width, and then each time a further read response is received from the same read-triggering request it can be merged into that single entry to be combined with any earlier received read responses, until all the required read responses for the read-triggering request have been received.

Hence, by using the relative data width indication, decisions on allocation of resource in the read response buffer can be made so as to avoid allocating resource if it is not needed or to better select the particular way in which resource is allocated for a read-triggering request, or to control the timing at which read-triggering requests are issued based on the availability of resource in the read response buffer.

For example, when the relative data width indication indicates that read responses received at the selected egress port have a narrower data width than read responses to be provided to the requesting node by the predetermined type of ingress port and at least a portion of the read response buffer has insufficient capacity for handling the read-triggering request, the routing circuitry may prevent issue of the read-triggering request to the selected egress port. On the other hand, when the relative data width indication indicates that the read response is received at the selected egress port have the same data width or a greater data width and the read response is to be provided to the requesting node by the predetermined type of ingress port, then issue of the read-triggering request to the selected egress port may be allowed even if the portion of the read response buffer which would be used if the selected egress port did use narrower data widths is not available. In some cases the decision on whether to issue a read-triggering request to the selected egress port may also depend on other factors as well as resource availability in the read response buffer so the relative data width indication may simply be one parameter considered in order to determine whether the read-triggering request can be issued. Nevertheless, if all the other parameters considered indicate that the read-triggering request can be issued, then non-availability of space in the read response may not block progress of the read-triggering request if the relative data width indication indicates that the selected ingress port uses read responses of the same data width or greater data width than those used by the predetermined type of ingress port.

The control over allocation of resource in the read response buffer based on the relative data width indication can be performed in different ways. In some examples the routing circuitry may determine whether to allocate space in the read response buffer for handling the read-triggering request, depending on the relative data width indication. For example, if the only purpose of the read response buffer is for buffering read responses so that they can be assembled into a wider data width, then there is no need to allocate any space in the read response buffer for a request which targets a selected egress port which does not receive responses with a narrower data width. In this case, if the relative data width indication indicates that the selected egress port uses read responses with a greater or same data width than those used at the predetermined type of ingress port, there is no need to allocate space in the read response buffer at all.

However, in other implementations the read response buffer could also be used for other purposes, not just the reassembly of narrower responses into a wider combined response. In this case, then even if a particular read-triggering request targets a selected egress port which will not receive read responses having the narrower data width than those used at the predetermined type of ingress port, some space may still be required in the read response buffer. In this case, the relative data width indication can still be useful in order to determine which portion of the read response buffer is used for handling the read-triggering request.

Not all the entries of the read response buffer need to be provided with logic which would permit reassembly of responses into a wider data width, since it can be known in advance which requests will or will not require this reassembly and so they can be directed to the portions of the buffer which do or do not support reassembly as appropriate. This can then be exploited so that fewer buffer entries need to permit reassembly and hence area and power can be saved (in comparison, if it was not known in advance whether a particular request will return read responses with a narrower data width requiring reassembly into a combined response, then every buffer slot would need the reassembly logic).

Hence, the read response buffer may comprise a first portion and a second portion. The response assembly circuitry may be capable of assembling the combined response based on a read response stored in the first portion of the read response buffer, but may be incapable of assembling the combined response based on a read response stored in a second portion of the read response buffer. In response to the read-triggering request, the routing circuitry may select, depending on the relative data width indication, which of the first and second portion of the read response buffer should be used for handling that read-triggering request. The routing circuitry may select the first portion (which is capable of permitting reassembly of read responses into a combined response) when the relative data width indication indicates that read responses received at the selected egress port have a narrower data width than read responses to be provided to the requesting node by the predetermined type of ingress port.

Hence, those requests which are known will trigger narrower responses can be prioritised for use of the first portion and if there is no space in the first portion then such requests may be stalled. However, a request which targets a selected egress port for which the relative data width indication indicates that the selected egress port will receive read responses of the same or greater data width than the read response to be provided by the ingress port can be handled using either the first portion or the second portion so even if there is insufficient space in the first portion, this need not block progress of requests which could still be handled using the second portion of the read response buffer. If it is possible to handle a given read response using either the first portion or the second portion, the routing circuitry may preferentially select the second portion to avoid using up resource in the first portion which could otherwise block progress of those requests which target a selected egress port which does have a narrower read response data width. Nevertheless, if a read-triggering request needs to be handled for which the relative data width indication indicates that the read responses do not have a narrower data width, and the only resource available is in the first portion of the read response buffer, then it would still be possible to allocate that request to the first portion even though it does not actually require use of the response assembly circuitry for assembling the combined response. The relative size of the first and second portions of the read response buffer may be selected during design of the interconnect depending on knowledge of required traffic patterns expected for the interconnect when in use.

The interconnect may have storage circuitry for storing two or more respective relative data width indications each corresponding to a given pair of an ingress port and an egress port and indicating whether the egress port receives read responses with a narrower data width than the read responses to be provided by the ingress port. In some cases each of the relative data width indications may be stored by a central storage unit within the interconnect which can be looked up by any ingress port to check whether its selected egress port uses responses with a narrower data width than it uses itself. However, this may provide additional delays in routing requests for the relative data width indication across to the central storage. Therefore, it can be more efficient to provide a distributed storage circuitry for storing the relative data width indications where each predetermined type of ingress port has local storage circuitry for storing at least one relative data width indication specifying whether a given egress port uses narrower read responses than that particular ingress port.

In some cases the relative data width indication may be looked up alongside the decoding of the target address of a data access request. Hence, the predetermined type of ingress port may have an address decoder which looks up, in response to an address specified by the read-triggering request, address mapping information specifying an identifier of the selected egress port and the relative data width indication. For example, each ingress port may already have a storage structure for storing routing information which specifies for particular addresses or address ranges, which egress port which should be selected and/or the path along which the request should be routed to reach that selected egress port, e.g. a sequence of routers to the traversed. Such a storage structure can be provided with an additional field which specifies the relative data width indication indicating whether the selected egress port uses read responses with a narrower data width. The relative data width field of the address mapping structure could be populated at the time of reprogramming the address mapping data, based on a lookup of a separate structure within the ingress port which specifies the relative data width values to be used for each egress port that can be selected by the ingress port. Alternatively, the address decoder could look up the relative data width indication from a separate structure from the egress port routing information.

In some examples the relative data width indication may comprise a Boolean flag. Hence, the relative data width indication may simple be a true/false value indicating whether or not the selected egress port uses responses with a narrower data width than those used by the predetermined type of ingress port. There is no need for the absolute data width to be of the responses received out the selected egress port to be indicated by the relative data width indication as the absolute response size may not affect the resource allocation or the decision on whether to issue the read-triggering request depending on whether the resource is available. By using a Boolean flag (e.g. a 1-bit value) this can reduce the storage capacity required and so the additional overhead of providing the relative data width indications can be low. Also, this avoids the need to provide comparators for comparing absolute data widths.

The read-triggering request can be any request which requires a read response. A read response may be any response which provides information which depends on data read from a target storage location identified by an address specified by the read-triggering request. The read response could provide the actual data read from the target storage location, or could provide data which has been derived from the read data (e.g. by combining the read data with another value using an arithmetic or logical operation), or could provide the result of a comparison of the read data with another value. The read-triggering request may comprise a read request which simply requests that the destination node returns the value read from the target storage location. However, the read-triggering request could also comprise an atomic request for requesting that the destination node returns both the at least one read response and also a write response confirming servicing of a write operation for writing a data value to the target storage location. In some cases the value written to the target storage location by the atomic request may be dependent on the value read from the target storage location, for example based on the result of an arithmetic or logical operation applied to the read data and an operand provided by the atomic request, or based on a conditional comparison of the read data with a second data value with the write being performed conditional on the comparison result meeting certain criteria. Such atomic requests can be useful for performing operations which require a read and dependent write performed by one master or software process to be seen atomically by other masters or software processes, with any intervening processing between the read and write being performed closer to the memory component storing the data, instead of requiring the data to be read all the way back to a processor core to perform the intervening processing. By using an atomic request the delay between the read and the write can be reduced to improve performance, and avoid the need for other mechanisms such as locks for ensuring atomicity of the read and the write operation. Hence, the techniques discussed above can be applied to both read requests and atomic requests if atomic requests are supported by the interconnect.

The technique discussed above can be implemented in a physical interconnect which represents the actual component to be included in the integrated circuit.

However, the technique can also be embodied within a non-transitory storage medium which stores an electronic design file representing a design of an interconnect as discussed above. For example, the electronic design file may have a data structure which includes elements identifying that the interconnect includes a number of ports, with at least one of the ports being a predetermined type of ingress port supporting use of the relative data width indication as discussed above. The electronic design file could represent the interconnect at a low level, such as representing individual gates or transistors to be comprised by the interconnect, or could be represented at a higher level of abstraction, for example identifying certain basic blocks of components to be laid out within the interconnect, with each block corresponding to a certain known design of gates or transistors which can later be read by accessing a cell library which provides the gate level layout for each standard block. Using electronic design files to control the automated manufacture of integrated circuits can be useful because the number of transistors or gates in an integrated circuit in modern systems is so vast that a human designer is unlikely to be able to keep track of the detailed design of the overall system. By using the electronic design file the human designer can focus on higher level abstractions and design considerations, while the individual gate level representation can be filled in later by a computer based on previously prepared standard cells providing the gate level representation of basic blocks of components which can be combined in different combinations to provide the functionality required by the designer. The electronic design file can then be used to control the manufacturing equipment to actually manufacture the integrated circuit. Hence, in some cases the electronic design file may be provided by an integrated circuit developer to a manufacturer to instruct the manufacturer to manufacture their integrated circuit according to the specified design. Hence, the interconnect represented within such a design may have any of the features discussed above embodied within the data structures of the design file.

The relative data width indications discussed above may be specified for a particular interconnect during the design process for preparing the design of the interconnect, based on the knowledge of which particular egress ports will receive read responses which are narrower than the read responses used by a corresponding ingress port. This could be done automatically by a computer-implemented design process based on properties specified for the interconnect. Hence, in some cases a computer-implemented method for generating an electronic design file representing a design of interconnect may comprise a number of steps performed for a given ingress port of the interconnect. For the given ingress port, a subset of ports which are allowed to be selected as the selected egress port for read-triggering requests received at the given ingress port is identified. The method then identifies whether any of those subset ports are to receive read responses having a narrower data width than read responses to be provided to the requesting node by the given ingress port. When at least one of the subset of ports is to receive read responses which have a narrower data width than the read responses to be provided by the given ingress port, then the method comprises generating at least one relative data width indication which specifies for the given ingress port and a respective one of the subset of ports, whether read responses received at that one of the subset of ports have a narrower data width than read responses to be provided by the given ingress port. The electronic design file is then generated or updated to indicate that the interconnect comprises storage circuitry for storing the generated at least one relative data width indication. The particular values to be set for the relative data width indications for each ingress-egress port pair may be specified in the design file. These steps could be repeated for each ingress port of the interconnect.

Hence, the design process may include checking which pairs of ingress and egress ports are expected to encounter situations where the egress port uses read responses with a narrower data width than the ingress port, and the relative data width indications indicating the results of such comparisons of read data response width can be generated and embedded within the electronic design file as parameters of the design, so that when the interconnect is manufactured according to the design specified by the electronic design file, the interconnect is manufactured comprising storage circuitry to store such relative data width indications. During the actual use of the interconnect then these relative data width indications can then be looked up and used to control the allocation of resource as discussed above.

The comparison of the read response data width can also be used to select which elements are provided within particular ingress ports as represented by the electronic design file. For example, the response assembly circuitry to assemble a combined response having a wider data width from multiple read responses with a narrower data width could be provided for those ingress ports where at least one of the subset of ports which can act as the egress port has read responses with a narrower data width. The response assembly circuitry can be omitted from the given ingress port when none of the subset of ports which can act as the selected egress port are to receive read responses with a narrower data width than the read responses at the given ingress port. Hence, the design can use the information about the relative data widths of read responses at ingress and egress port pairs to make the interconnect design more efficient by avoiding providing the response assembly circuitry if it is not needed because none of the egress ports which can be targeted by a given ingress port actually use a narrower data width for the read responses. Similarly, control circuitry for controlling allocation of resource depending on the relative data width indication, and the storage circuitry which stores the relative data width indications, could be provided only in the ingress ports which do allow targeting of egress ports with a narrow read response data width, and could be omitted for other ingress ports which only communicate with egress ports which use the same data width or a greater data width for the read responses than that ingress port. Hence, the design process may include identifying which of the ports of the interconnect are the predetermined type of ingress port as discussed above and other ports may not function as a predetermined type if they do not need to communicate with a port which uses narrower read responses. The specification of whether a given ingress port does or does not have the response assembly circuit or other features discussed above could be controlled in different ways in the electronic design file, e.g. by selecting between different types of ingress port from a component library, or by selecting a common ingress port type but specifying different variable parameters for the port to control how that port is manufactured.

When the response assembly circuitry is included in the design of the ingress port, the response assembly circuitry may be capable of assembling the combined response based on a read response stored in a first portion of a read response buffer of the ingress port, and incapable of assembling the combined response based on a read response stored in a second portion of the read response buffer, and the method may comprise determining a relative size of the first portion and the second portion of the read response buffer based on an indication of required traffic patterns for the interconnect. For example, the percentage of buffer space allocated for the first portion may scale with the percentage of transactions received at the ingress port which are expected to target an egress port with a narrower read response data width. Hence, in designs for which the intended usage is expected to result in relatively few transactions targeting an egress port with a narrower read response data width, the first portion can be made relatively small and the second portion relatively large in comparison to the first portion, to avoid incurring unnecessary overhead in supporting more reassembly logic than is necessary.

In addition to generating the relative data width indications and configuring whether particular ingress ports need the features required for handling narrower read responses, the method of designing the interconnect may also include selecting an arrangement of routers for connecting the ports of the interconnect. The arrangement of routers may be selected automatically depending on design specification data provided by a user specifying requirements for the interconnect. For example the design specification may specify the physical position at which the ports are to be provided, for example enabling different numbers of routers to be provided depending on the distance across the integrated circuit along which signals need to be routed between particular points. Also, the design specification data may specify expected usage requirements for the ports, such as expected levels of bandwidth needed for particular pairs of ports to communicate. This can be useful for ensuring ports which are to be connected to requesting nodes expected to generate a high volume of traffic can be provided with routers and other elements of the interconnect which enable a greater level of traffic to be accommodated than for other ports which communicate with quieter masters. Hence, having selected the arrangement of routers, the electronic design file may be updated or generated to indicate those particular arrangement of routers. This enables automatic generation of a bespoke interconnect for a particular application or use case.

In some examples the interconnect may be a network on chip which provides a number of bespoke paths between respective pairs of ports connected by routers. The electronic design tooling may configure the arrangement of routers based on the system requirements as discussed above. Alternatively, the interconnect may have other topologies, e.g. the interconnect could connect the respective ports using a ring bus topology, a mesh topology, or a point-to-point topology (in which each pair of interfaces is linked by a dedicated channel). However, as the number of master and destination devices to be connected to the interconnect increases then the network on chip approach may become more efficient in terms of managing conflict for bandwidth on paths of the resource and enabling more bespoke designs to accommodate particular requirements of the system being built.

The method for generating the electronic design file may be controlled by computer programs stored on a non-transitory storage medium, which controls a computer or other data processing apparatus to perform the method discussed above.

Figure 1:
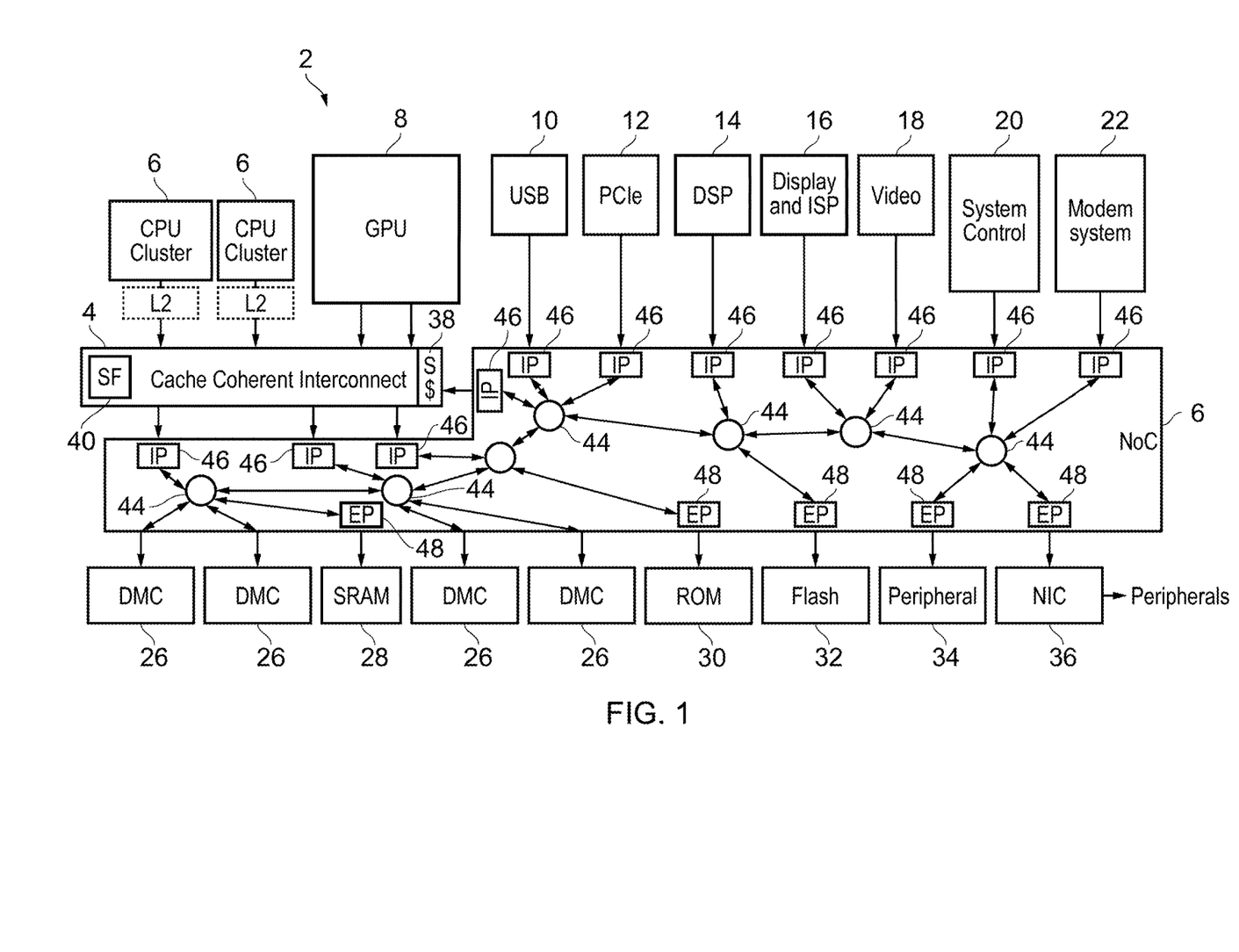
FIG. 1 shows an example of a data processing system having at least one interconnect.

FIG. 1 schematically illustrates an example of a data processing system 2 (e.g. an integrated circuit or system-on-chip) having data access routing circuitry 4, 6 for routing data access requests between requesting nodes and destination nodes and routing the responses to such data access requests from the destination nodes to the requesting nodes. In this example the system 2 includes a number of master devices, such as: one or more central processing units (CPUs) 6 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 6 to 22 may be capable of acting as a requesting node for issuing data access requests to be serviced by a destination node of the system.

The system may have a number of components which may act as destination nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the destination nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 6, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target destination node selected based on the target address specified by the request, and for routing of the responses back to the requesting node. The system interconnect 6 does not need to take responsibility for management of coherency between cache data in respective masters.

In this example, the system interconnect 6 is implemented as a network on chip (NoC) which comprises a number of routers 44 for coupling a number of master interfaces 46 (from which data access requests can be received from respective master devices 6-22) to a number of destination interfaces 48 (for outputting the requests to respective destination devices 26-36). Each master interface 46 (also known as an ingress port, IP) is responsible for decoding the address specified by the data access request to identify the particular route to be taken through the network on chip 6 via the routers 44 to reach a destination interface 48 associated with the selected destination node which is to service the data access request. In some cases the master interface 46 may also translate the protocol used for the request asserted to the network on chip 6 into an internal representation to be used for routing the request across the network on chip 6. If the requests are translated into an internal protocol, then the destination interfaces 48 (also known as egress ports, EP) may translate them back into the original protocol used by the request in order for servicing by the destination. Alternatively, some of the destination nodes may handle the request directly in the form used by the network on chip 6 so that no translation would be needed at the destination interface. For each destination interface 48, when it receives the response to a data access request from the destination node 26-36, the destination interface 48 issues that response back along the path taken by the corresponding request to the master interface 46 which issued the request, and the master interface 46 then returns the response to the requesting node.

A network on chip 6 as shown in FIG. 1 can be useful when there are a large number of master and destination devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and destination nodes which are expected to require a large amount of traffic then additional routers or signal channels can be provided between them, while other pairs of requesting/destination nodes may have less capacity.

The use of a network on chip is not essential and in other examples a different topology could be used within the system interconnect 6. For example, a series of point to point connections between the master and destination interfaces could be used, or a ring topology may be used in which all requests are asserted onto a ring bus and then circulate round until they reach the required target interface. Also, a mesh topology could be used where each interface 46, 48 is connected to a point on a grid and requests and responses may traverse between the points on the grid associated with the corresponding master and destination interfaces 46, 48. However, use of a network on chip can enable better scaling as the number of master and destinations increases.

Figure 2:
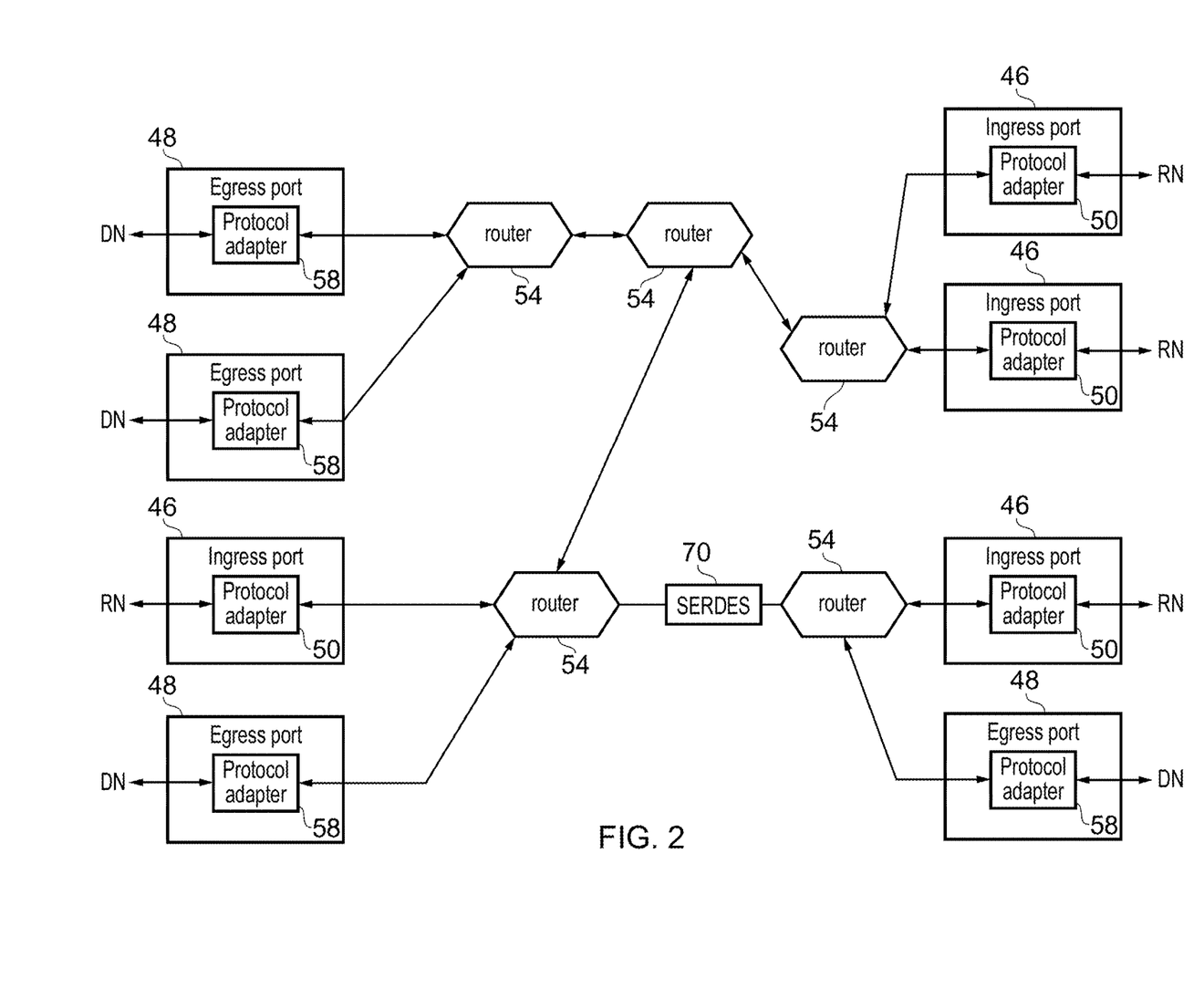
FIG. 2 shows an example of a network on chip acting as a system interconnect in the system of FIG. 1.

FIG. 2 shows an example of components on the network on chip (NoC) 6 in more detail. The NoC 6 comprises a number of components which can be combined in different layouts and arrangements depending on the particular arrangement of master devices and destination devices which are to be connected by the NoC 6. For example this may include any of the following components:

Ingress Port 46

The ingress port receives data access requests from a requesting node coupled to the ingress port. For example the ingress port may act as one of the master interfaces 46 shown in FIG. 1. The ingress port 46 may decode a target address as specified by the data access request received from the requesting node to identify which egress port 48 should be selected for handling the request, and generates routing information for controlling the routing of the request across the NoC to the selected egress port 48. Also, as requests routed within the NoC 6 may use a different protocol to the protocol used by the requesting nodes for the data access requests, the ingress port may include a protocol adapter 50 for translating the request into the transport protocol used on the network. The ingress port 46 transmits the translated packets onto the network accompanied by routing information identifying how network packets corresponding to the request should be routed across the NoC. The ingress port 46 may also provide other functions such as managing resource allocation for particular requests, and controlling a quality of service level provided for requests from different sources so as to balance the competing needs of different master devices for bandwidth on the network. For example the ingress port 46 may have various buffers for buffering tracking information relating to requests and buffering responses to the requests. The ingress port 46 may control allocation of resource and issuing of requests based on availability of space in the buffers, and based on the quality of service requirements (e.g. providing a limit to the number of currently outstanding transactions that can be pending at a given time, or a limit to the number of transactions from a given requesting mode which are serviced within a given period).

Router 54

Each router 54 is responsible for routing packets received from one component of the NoC 6 and selecting which other component the packet should be directed to, based on the routing information specified by the packets which has been appended to the packet by the ingress port 46 at which the corresponding request originated. The particular arrangement and number of routers 54 that are provided may depend on the particular system requirements. For example, if ingress and egress ports are separated by a large distance on the integrated circuit then more routers may be required to provide sufficient repetition of packets to maintain signal level when the packets reach their destination. Also the topology in which the routers are connected may be selected based on expected bandwidth requirements for particular pairs of ports 46, 48.

Egress Port 48

The egress port 48 receives the network packets representing data access requests that were generated by the ingress port 46 and routed across the NoC via the routers 54. The egress port 48 has a protocol adapter 58 for translating the transport protocol of the network packets back into the protocol used by the destination node to which the egress report is connected. When a response to a data access request is received from a destination node which has serviced the data access request to provide a read response, a write response or both, then those responses are adapted for the transport protocol of the network by the protocol adapter 58 in the egress port 48 and then output onto the network by the egress port 48. The response packets are then routed back to the ingress port 46 which received the original data access request which triggered those responses, along a corresponding path to the one taken by the data access request packets but in the reverse direction. Hence again the protocol adapter 58 may append routing information specifying the route to be taken by the response packets. When these response packets are received at the ingress port 46, the protocol adapter 50 converts them into the responses expected by the requesting nodes and forwards them onto the requesting node.

Data Resizer 70

It may be needed to resize data values being transmitted across the network when being provided from one component to another. For example the data associated with one packet could be spilt into separate packets each with a smaller data size, or multiple smaller packets could be combined into a single packet. If the resizing is such that the number of input packets and the number of output packets follows a many-to-one or one-to-many relationship then the resizer 70 may act as a serialiser-deserialiser (SERDES) as shown in FIG. 2. However, it is also possible for resizers to provide an M:N resizing of data packets where both N and M are greater than 1, and in this case a more general resizer may be provided to map the data associated with a certain group of input packets to the data associated with a different number of output packets.

It will be appreciated that the network-on-chip 6 could also include other components not shown in FIG. 2.

Figure 3:
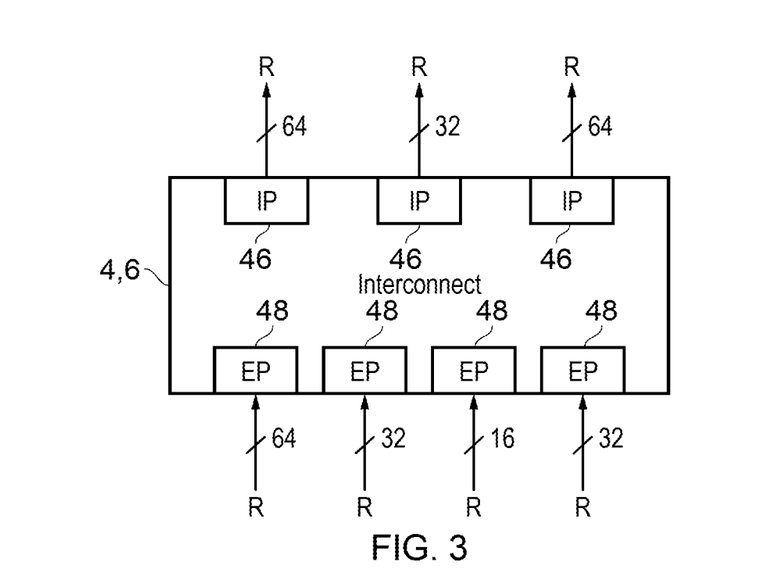
FIG. 3 shows an example of interconnect with ingress ports and egress ports which operate using read responses of different data widths.

FIG. 3 shows a general representation of an interconnect, which could be the cache coherent interconnect 4 or a system interconnect or network on-chip 6. As shown in FIG. 3, different ports on the interconnect could operate using read responses with different data widths. A read response is a response provided by a destination node in response to a read-triggering request which provides data read from a target storage location in response to the read/trigger request, or which provides data which depends on the data value read from the target storage location (e.g. with atomic data access requests, the value returned with the read response may not be the same as the value read from the target storage location, as the returned data value could for example be the result of adding a second value to the read value, or combining the read value or the second value using AND, OR, XOR or another logical operation, or could depend on a conditional comparison of the read value with a further value).

For example, in FIG. 3 different ingress or egress ports 46, 48 operate with read responses which use either 64-bit data, 32-bit data or 16-bit data. The reason for the different response data widths could be because the physical signal channel used by the corresponding ingress port 46 or egress port 48 may have that particular data width, or alternatively, a narrower response could be received over a wider physical channel if elements downstream of an egress port use a narrower data size and there are no components between that element and the egress port which recombine multiple narrower data values into a wider combined value.

Hence, depending on the particular egress port 48 used for handling a data access request received at a particular ingress port, the data widths of the read responses used on the respective ingress and egress ports may be different or the same. In cases where the ingress port's read response is the same size as the egress port's read response, or where the ingress port's read response data width is narrower than the egress port's read response data width, then there may be no need for buffering up multiple responses received from the egress port 48 before the response is generated to send to the requesting node via the ingress port 46. In these cases a single response received from the ingress port can be used to generate all the information needed to send to the requesting node over the ingress port 46. Buffering may still be performed for other purposes, but it is not needed for handling an increase in data width from egress port to ingress port.

However, in cases where the data width of the read responses used by the egress port 48 is narrower than the data width of the read responses received at the ingress port 46, it may be desirable to buffer read responses received from the egress port so that they can be reassembled into a combined response to be sent to the requesting node via the ingress port. This avoids burdening the requesting node itself with multiple responses of smaller data size. However, this buffering requires resource to be allocated in the ingress port 46 for holding the read responses until all the multiple responses of smaller data size have been received from the egress port. If it is not known at the time of issuing network packets from the ingress port to the egress port whether the egress port will use a narrower response data width in the ingress port, then all requests would need to have resource reserved in this buffering and reassembly logic for their lifetime, which could lead to stalling of transactions if there is insufficient buffer resource available, and also an actual check of the response width would be needed on receiving a response which can add latency on the critical path for processing read responses.

Figure 4:
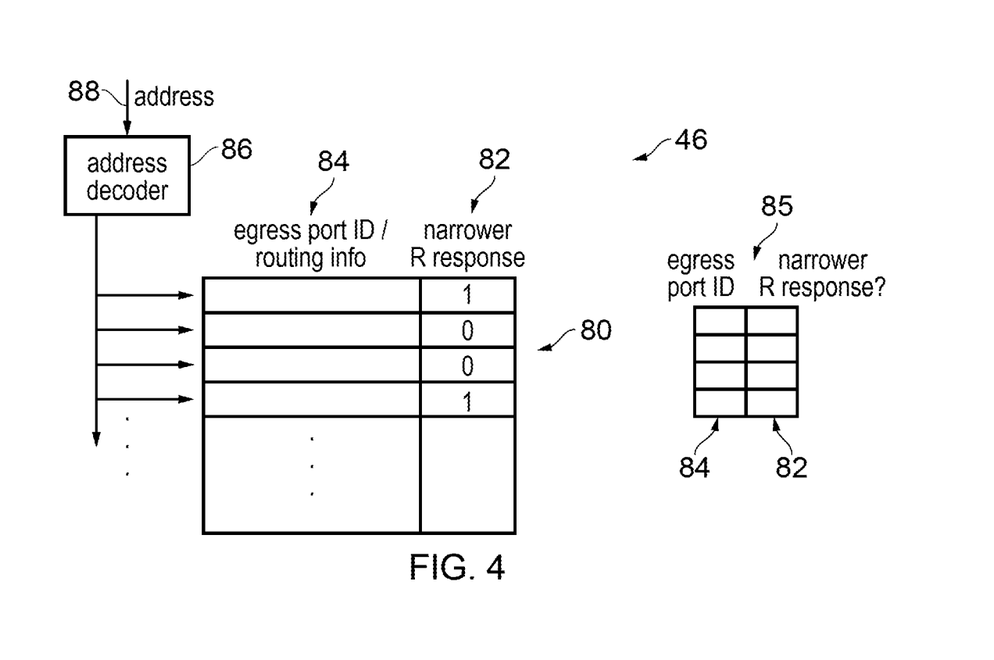
FIG. 4 shows an example of an address decoder in one of the ingress ports which identifies a relative data width indication corresponding to the target address of a request requiring a read response.

As shown in FIG. 4, the ingress port 46 may be provided with storage circuitry 80 which stores at least one relative data width indication 82 which indicates for particular egress ports with which that ingress port 46 can communicate, whether the read responses which will come back from that egress port are narrower than the read responses to be provided by that ingress port 46 to the corresponding requesting node. In this example the storage circuitry 80 is combined with an address mapping storage structure for providing routing information 84 for routing packets across the LAC 6. An address decoder 86 decodes the target address 88 of a data access request to identify which egress port 48 is the selected egress port which is to handle the request (or in the case of destination nodes which are internal within the interconnect, identifying some routing information which enables the corresponding request packets to be sent to that internal node). By providing an additional field 82 alongside the routing information 84 specifying whether the selected egress port will generate narrower read responses than is used at the current ingress port, this can enable better allocation of resources for handling the read responses.

As the address mapping data may be reprogrammable by software, in addition the ingress port may have a separate storage structure 85 in the ingress port mapping egress port identifiers to the corresponding relative data width indications 82. When a given entry of the address mapping storage 80 the address mapping information is reprogrammed, the new egress port identifier for the reprogrammed entry can be looked up in the data width indication storage 85 and the matching relative data width indication written to the reprogrammed entry in field 82 alongside the routing information 84. This enables subsequent address lookups to return both the routing information 84 and the relative data width indication 82 in a single lookup. Alternatively, instead of providing an extra field in the address mapping storage 80 for the relative data width indications 82, the data width storage structure 85 could be looked up separately for every address lookup, once the egress port identifier 84 has already been looked up in the address storage 80 by the address decoder 86.

Figure 5:
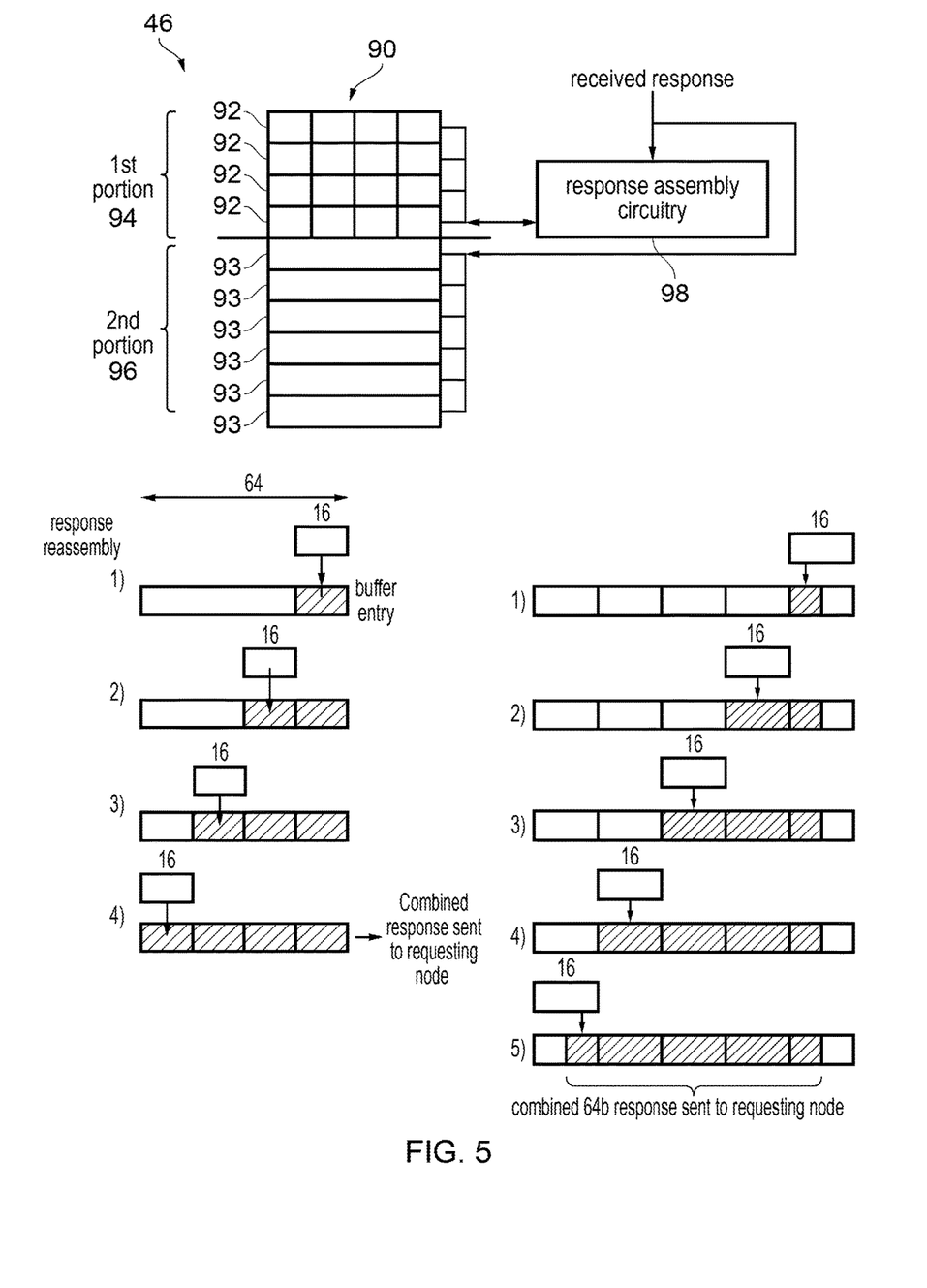
FIG. 5 shows an example of a read response buffer for storing read responses received in response to read-triggering requests.

As shown in FIG. 5, the ingress port 46 may have response buffer circuitry 90 which includes a number of buffer slots 92, 93 each for buffering one or more read responses received in response to read-triggering requests (such as read requests or atomic requests requiring a read response). The buffer 90 has a first portion 94 including a first type of buffer slots 92 and a second portion 96 including a second type of buffer slots 93. Response assembly circuitry 98 is provided for assembling a combined response comprising a data value of a wider data width from multiple responses of a narrower data width. The response assembly circuitry 98 is capable of performing this reassembly based on responses stored in the first portion 94 of the buffer 90 but is incapable of assembling responses from the second portion 96 of the buffer. This saves circuit area by avoiding needing to provide the response assembly logic for every buffer slot 92.

Two examples of the response reassembly process performed for an individual buffer entry is illustrated at the bottom of FIG. 5. In the bottom left example the target address is aligned to an address boundary, and the ingress port 46 uses read responses with a 64-bit data width, but one of the egress ports 48 with which that ingress port 46 may communicate receives 16-bit data in its read responses, and so four separate read responses may be combined to assemble a single response to be sent to the requesting node from the ingress port 46. Hence, as each individual 16-bit response is received, it can be packed into a 64-bit data value as shown in steps 1 to 4 in the bottom left of FIG. 5 until all four responses have been received and the combined response can then be sent. While this example shows the four responses being received in the order from the least significant portion of the 64-bit value to the most significant portion, this is not essential as in some cases the packets may be received in an arbitrary order as some packets may be reordered en route within the network on chip or interconnect. Alternatively, if the target address is not aligned to an address boundary, the ingress port may receive a wrapped burst of responses as shown in the bottom right example, in which case the start of the required data may be located part-way through the data returned in the first response by the destination node and so N+1 response packets may be needed in order to accumulate enough data to produce a response to be sent to the requesting node of data width N times the data width used by the egress port (e.g. with 64-bit data on the ingress port and 16-bit data on the egress port, 5 responses may need to be reassembled to product the 64-bit data for the response to the requesting node).

Hence, when a read-triggering request is received at the ingress port and the address is decoded by the address decoder 86, the relative data width indication 82 corresponding to that address can be looked up to determine whether the egress port 48 which will be used for that request has read responses with a narrower data width. If so, then the request has to be handled using a buffer entry 92 in the first portion 94 of the buffer 90. If there is no space in the first portion 94 then the request can be stalled. If the relative data width indication 82 specifies that the egress port uses the same data width or a greater data width than the ingress port then either the first portion 94 or the second portion 96 can be used as there is no need to provide reassembly. For requests placed in the second portion 96 there may still be a need for buffering of read responses e.g. for controlling a relative order in which responses are provided to the requesting node. Hence, by providing information at the time of receiving the original data access request which specifies the anticipated size of the read response which will be received in response to that request, this enables better control over which resources are allocated so that it is not necessary to provide the resource specific to narrower read responses for every request. Also, this means that responses are already known not to trigger a narrower read response do not need to wait for the first portion 94 of the buffer to become available and so can make progress even if there is no response assembly resource available.

In FIG. 4 each relative data width indication is represented as a 1-bit flag providing a Boolean flag indicating simply whether the read responses at the egress port are narrower (flag value 1) or have the same width or greater width (flag value 0) than the responses at the ingress port. It will be appreciated that other ways of representing the same information could be used. However, by using a 1-bit Boolean flag or other relative data width indication which merely identifies the comparison between the ingress port response width and the egress port response width, but does not indicate the absolute data width used by the ingress port, this can make the logic of the ingress port more efficient in terms of circuit area and power because there is no need to provide comparators for comparing the absolute data width.

Figure 6:
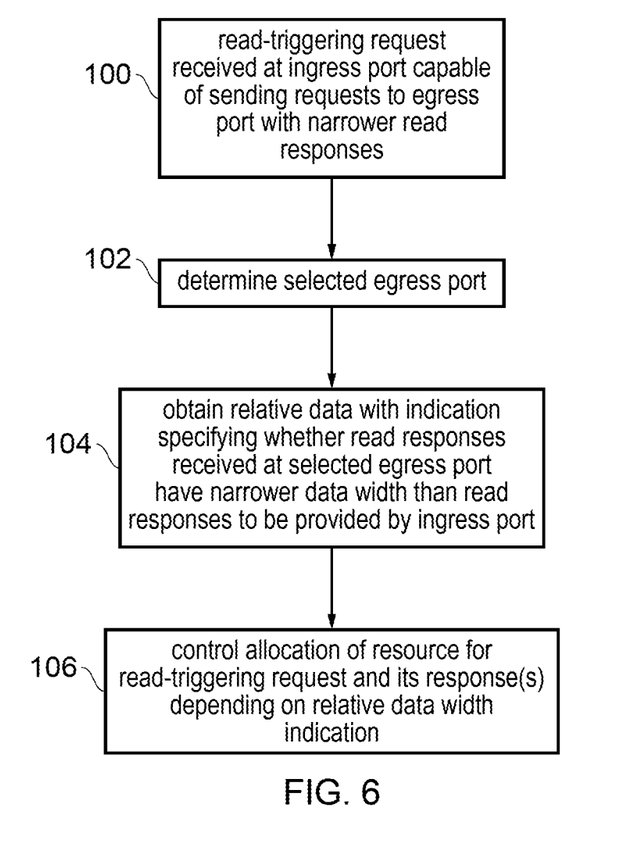
FIG. 6 is a flow diagram showing a method for handling re-triggering requests using the interconnect.

FIG. 6 shows a flow diagram illustrating a method of handling read-triggering requests using an interconnect 4, 6. At step 100 a read-triggering request (e.g. a read request or an atomic request) is received at a given ingress port 46 which is capable of sending requests to an egress port which may use narrower read responses. At step 102 the ingress port 46 which receives the request determines which egress port 48 is the selected egress port to which the request should be routed. At step 104 the ingress port 46 obtains a relative data width indication specifying whether the read responses received at the selected egress port have a narrower data width than the read responses to be provided by the ingress port 46. At step 106 the ingress ports controls allocation of resource for the read-triggering request and its response(s) depending on the relative data width indication. While in FIG. 5 this may correspond to controlling whether the response buffer allocation is within the first portion or the second portion 94, 96, in other approaches if there is no need to buffer responses for any request other than those targeting an egress port with a narrower read response width, then the allocation control step 106 could determine whether any resource in the read response buffer is allocated at all for the request, rather than selecting which portion is used for the request.

Figure 7:
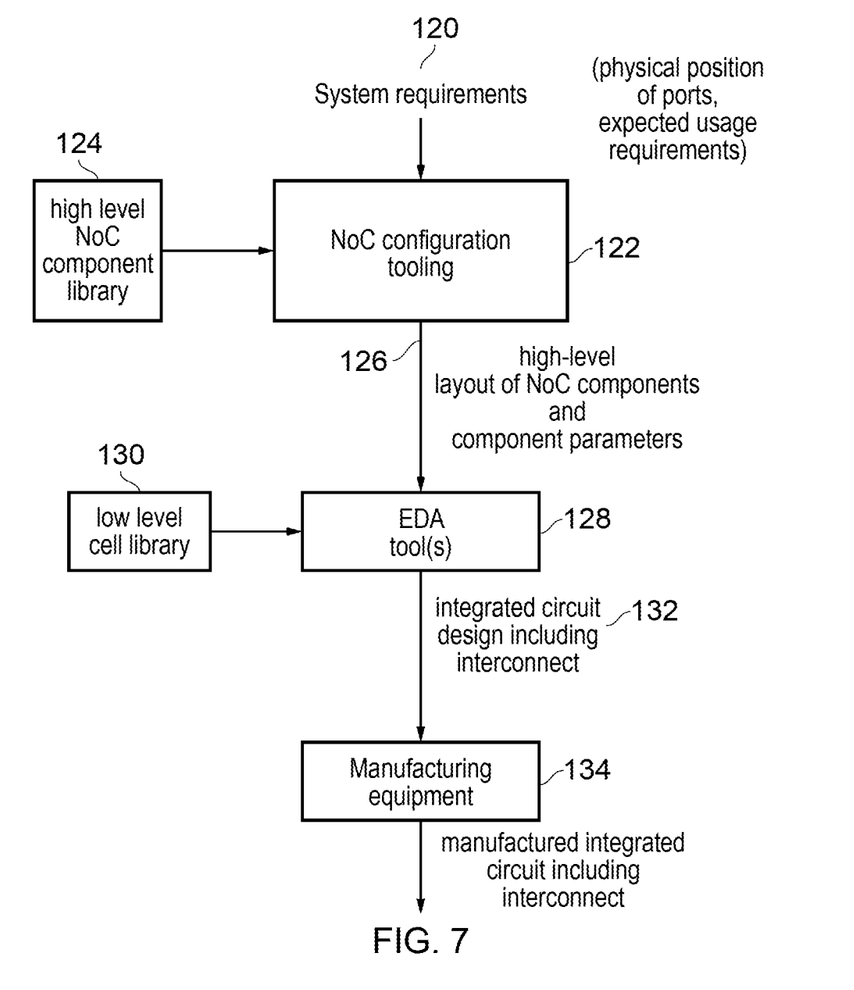
FIG. 7 schematically illustrates design and manufacture of an integrated circuit including an interconnect.

The particular values for the relative data width indications 82 may be generated by system tooling within an electronic design process performed to design the physical integrated circuit layout of the interconnect 4, 6. FIG. 7 schematically illustrates an example of an electronic design process which may use automated design techniques to simplify the design process. A system designer or an electronic design tool performing an earlier stage of the design process may specify various system requirements 120, such as the physical position of the ports 46, 48 to be used for the integrated circuits interconnect, and/or expected usage requirements (e.g. which pairs of ports are likely to require communication links between them and the expected level of bandwidth for different pairs of ports depending on expected data traffic or prioritisation of different masters relative to each other). A NoC configuration tooling program 122 executed on a data processing apparatus may use the system requirements, together with a component library 124 providing a high level representation of the various NoC components which can be selected for assembling the NoC, to generate an electronic design file 126 which provides a high level layout of the NoC components and specifies various parameters of those components such as parameters for configuring the particular properties of the components.

For example, the component library 124 could specify a range of components, such as the ingress port 46, egress port 48, routers 54, or resizers 70 as discussed above with respect to FIG. 2. For some of these types of component multiple alternative types could be specified in the component library for selection depending on the particular needs of the system requirements. Alternatively a single type of component could be provided but the NoC configuration tooling 122 may specify, as properties of a given component, certain variables which may tune behaviour of a given component of the NoC or control how that component is manufactured. For example, the parameters for an ingress port could specify the size of the response buffer 90 to be provided, and could specify whether or not the response assembly circuitry 98 needs to be provided. The NoC configuration tooling 122 may determine such requirements based on the system requirements that were input. Part of the NoC configuration function may be to check the particular pairs of ingress port 46 and egress port 48 to identify which of the ports has a narrower response data width, and then the NoC configuration tooling 122 may set component parameters for particular ingress ports of the NoC to specify, for each pair of ingress and egress ports, whether or not the corresponding relative data width indication 82 should indicate that the egress port has a narrower data width. Also, the relative size of the first and second portions 94, 96 of the read response buffer 90 can be specified by the NoC configuration tooling 122 depending on information specifying anticipated levels of network traffic expected for different pairs of ingress/egress ports, for example.

The high level layout file 126 generated by the NoC configuration tooling 122 is provided to an electronic design automation (EDA) tool 128 which uses a low level cell library 130 specifying standard cells of integrated circuit components at a more detailed level than the NoC component library 124, and generates an integrated circuit design file 132 which specifies the particular gates or transistors to be generated for the integrated circuit which includes the interconnect designed by the NOC configuration tooling 122. In some cases the EDA 128 may actually comprise a number of tools which gradually iterate the design to produce more and more detailed circuit-level representations. The EDA tools 128 may also carry out timing analysis to check whether the designed circuit would meet its timing requirements (testing for setup and hold violations for example), and may iterate the design if earlier attempts fail the timing analysis. The eventually prepared integrated circuit design represented by the design file 132 is the provided to a manufacturer who uses the design file to control manufacturing equipment 134 to manufacture the integrated circuit with the required connections between transistors in order to implement an integrated circuit including the interconnect.

Figure 8:
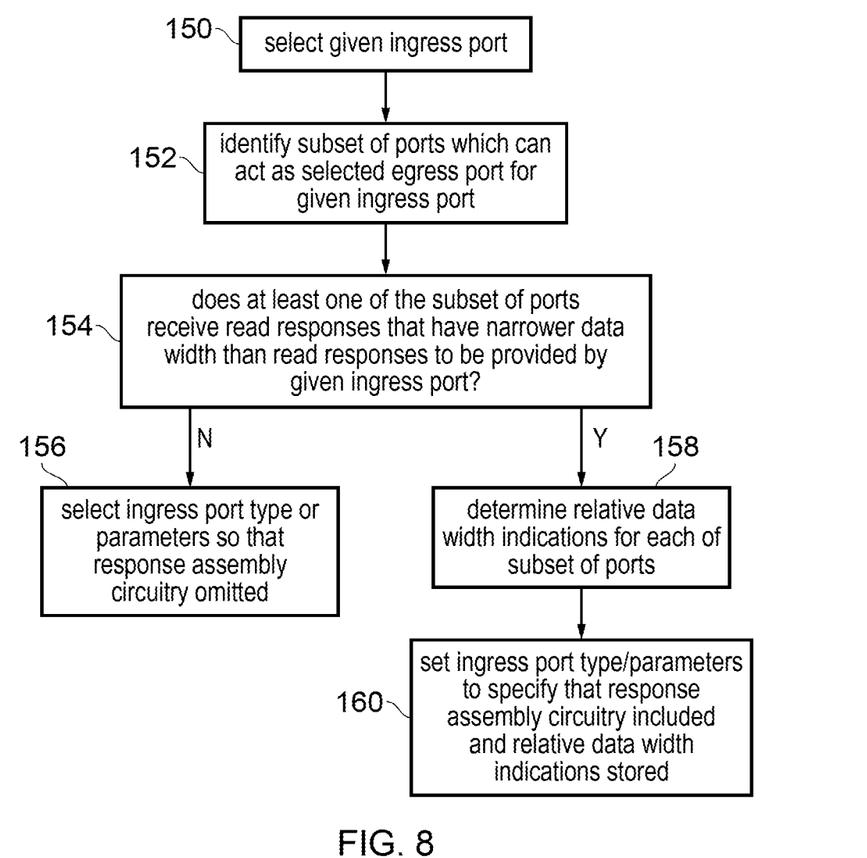
FIG. 8 is a flow diagram illustrating a method of generating an electronic design file representing a design of an interconnect.

FIG. 8 shows a flow diagram showing functionality which may be performed by the NoC configuration tooling 122 during the design process of FIG. 7. The tooling 122 may already have obtained information identifying the particular combinations of ingress ports and egress ports which are required and have identified the data widths to be used on the read responses for those ingress and egress ports. The method of FIG. 8 is shown for one particular ingress port referred to as the given ingress port, but it will be appreciated that this method could be repeated for each other ingress port 46.

Hence, at step 150 a given ingress port of the interconnect is selected by the NoC configuration tooling 122. At step 152 a subset of egress ports 48 which can act as the selected egress port for the given ingress port is identified. At step 154 the tooling 122 identifies whether at least one of the subset of ports identified at step 152 will receive read responses that have narrower data width than read responses to be provided by the ingress port. If not, then at step 156 the tooling may select, for the given ingress port, an ingress port type from the component library 124 which does not have the response assembly circuitry 98 provided. Also, this type of ingress port could omit the response buffer circuitry 90 altogether if this buffer is not required for any purpose other than assembling narrower responses into a wider response. Also, other circuitry within the ingress port could also be omitted, such as the storage circuitry for storing the relative data width indications 82 which would not be required if there is no possibility of the ingress port communicating with an egress port which will provide narrower responses. Similarly, the selected ingress port type may have issue control circuitry which, when deciding whether to issue a read-triggering request, may issue the request independently of whether there is any response assembly logic or resource available. Alternatively, rather than selecting a different type of ingress port from the component library 124 to the type of ingress port having these features, step 156 could instead use the same ingress port type but specify parameters of the ingress port which indicate that the response assembly circuitry, relative data width indications storage, etc. are not needed and so should not be included when the ingress port is manufactured.

On the other hand, if at step 154 it is determined that at least one of the subset ports which could act as the selected egress port does receive read responses with a narrower data width than the read response is to be provided by the ingress port then at step 158, the system tooling 122 determines the relative data width indications 82 for each of the subset of ports identified at step 152. At step 160 the tooling 122 sets either the ingress port type or the parameters of the ingress port to specify that the ingress port should include the response assembly circuitry 98, storage for storing the relative data width indications identified at step 158, and allocation control circuitry for controlling issuing of read-triggering requests depending on whether there is space in the portion of the response buffer capable of permitting reassembly of narrower responses, and any other features needed for handling narrower read responses. Also, the tooling 122 sets the relative size of the first and second portions 94, 96 of the read response buffer 90 based on the information on required traffic patterns expected for the NoC when in use.

In summary, by including instructions for performing the method of FIG. 8 in the software providing the NoC configuration tooling 122, this enables a more efficient NoC to be implemented since ingress ports which do not require any reassembly logic can be identified at the design stage and the circuit components required for this functionality can be omitted (providing a static circuit area/power advantage by avoiding providing circuitry which will not actually be used in practice). In addition, for other ingress ports which do sometimes need the reassembly logic, the NoC tooling identifies which particular egress ports will or will not need use of the reassembly logic, and so this allows the resources for reassembly to be saved for those requests actually targeting the egress ports using narrower read responses, and avoids other requests being delayed unnecessarily merely as a precaution in case they need reassembly (hence providing a dynamic performance advantage at the time of use of the interconnect).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interconnect for providing data access between nodes of an integrated circuit, comprising:
   a plurality of ports, each port to exchange data with a corresponding node of the integrated circuit, wherein at least one of the ports is a predetermined type of ingress port comprising:
      routing circuitry responsive to a read-triggering request received from a requesting node at the predetermined type of ingress port, to select from among the plurality of ports a selected egress port via which signals are to be routed to a destination node to control the destination node to return via the selected egress port at least one read response dependent on data read from a target storage location;
      wherein in response to the read-triggering request, the routing circuitry is configured to obtain a relative data width indication specifying whether read responses received at the selected egress port have a narrower data width than read responses to be provided to the requesting node by the predetermined type of ingress port, and to control allocation of resource for handling the read-triggering request or the at least one read response depending on the relative data width indication.

2. The interconnect according to claim 1, wherein the predetermined type of ingress port comprises:
   a read response buffer to store read responses received in response to read-triggering requests; and
   response assembly circuitry to assemble a combined response having a wider data width from a plurality of read responses including at least one read response stored in at least a portion of the read response buffer;
   wherein the resource comprises space in the read response buffer.

3. The interconnect according to claim 2, wherein when the relative data width indication indicates that the read responses received at the selected egress port have a narrower data width than read responses to be provided to the requesting node by the predetermined type of ingress port, the routing circuitry is configured to provide the combined response assembled by the response assembly circuitry to the requesting node via the predetermined type of ingress port.

4. The interconnect according to claim 2, wherein when the relative data width indication indicates that the read responses received at the selected egress port have a narrower data width than read responses to be provided to the requesting node by the predetermined type of ingress port and said at least a portion of the read response buffer has insufficient capacity for handling the read-triggering request, the routing circuitry is configured to prevent issue of the read-triggering request to the selected egress port.

5. The interconnect according to claim 2, wherein the routing circuitry is configured to determine whether to allocate space in the read response buffer for handling the read-triggering request, depending on the relative data width indication.

6. The interconnect according to claim 2, wherein the read response buffer comprises a first portion and a second portion; and
   the response assembly circuitry is capable of assembling the combined response based on a read response stored in the first portion, and incapable of assembling the combined response based on a read response stored in the second portion.

7. The interconnect according to claim 6, wherein in response to the read-triggering request, the routing circuitry is configured to select, depending on the relative data width indication, which of the first portion and the second portion of the read response buffer should be used for the read-triggering request.

8. The interconnect according to claim 7, wherein the routing circuitry is configured to select the first portion when the relative data width indication indicates that read responses received at the selected egress port have a narrower data width than read responses to be provided to the requesting node by the predetermined type of ingress port.

9. The interconnect according to claim 1, wherein the predetermined type of ingress port comprises storage circuitry storing at least one relative data width indication, each relative data width indication specifying, for a corresponding egress port, whether read responses received at the corresponding egress port have a narrower data width than read responses to be provided to the requesting node by the predetermined type of ingress port.

10. The interconnect according to claim 1, wherein the predetermined type of ingress port comprises an address decoder to look up, in response to an address specified by the read-triggering request, address mapping information specifying an identifier of the selected egress port and the relative data width indication.

11. The interconnect according to claim 1, wherein the relative data width indication comprises a Boolean flag.

12. The interconnect according to claim 1, wherein the read-triggering request comprises one of:
   a read request to request that the destination node returns the at least one read response dependent on data read from the target storage location; and
   an atomic request to request that the destination node returns both the at least one read response and a write response confirming servicing of a write operation for writing a data value to the target storage location.

13. A method for providing data access between nodes of an integrated circuit using an interconnect comprising a plurality of ports, each port to exchange data with a corresponding node of the integrated circuit; the method comprising:
   in response to a read-triggering request received from a requesting node at a predetermined type of ingress port among the plurality of ports:

selecting from among the plurality of ports a selected egress port via which signals are to be routed to a destination node to control the destination node to return via the selected egress port at least one read response dependent on data read from a target storage location;

obtaining a relative data width indication specifying whether read responses received at the selected egress port have a narrower data width than read responses to be provided to the requesting node by the predetermined type of ingress port; and controlling allocation of resource for handling the read-triggering request or the at least one read response depending on the relative data width indication.

14. A non-transitory storage medium storing an electronic design file representing a design of an interconnect according to claim 1.

15. A computer-implemented method of generating an electronic design file representing a design of an interconnect for providing data access between nodes of an integrated circuit;

the electronic design file defining the interconnect comprising a plurality of ports, each port to exchange data with a corresponding node of the integrated circuit;

the electronic design file indicating, for each port, a data width of read responses to be exchanged by that port with the corresponding node;

wherein the ports include at least one ingress port for receiving a read-triggering request from a requesting node and selecting from among the plurality of ports a selected egress port via which signals are to be routed to a destination node to control the destination node to return via the selected egress port at least one read response dependent on data read from a target storage location;

the method comprising, for a given ingress port:

identifying a subset of ports which can be selected as the selected egress port for read-triggering requests received at the given ingress port; and when at least one of the subset of ports is to receive read responses having a narrower data width than read responses to be provided to the requesting node by the given ingress port:

generating at least one relative data width indication, each relative data width indication specifying, for the given ingress port and a respective one of the subset of ports, whether read responses received at the one of the subset of ports have a narrower data width than read responses to be provided to the requesting node by the given ingress port, and generating or updating the electronic design file to indicate that the interconnect comprises storage circuitry to store the at least one relative data width indication.

16. The method of claim 15, wherein when at least one of the subset of ports is to receive read responses having a narrower data width than read responses to be provided to the requesting node by the given ingress port, the electronic design file is generated or updated to indicate that the given ingress port comprises control circuitry to control allocation of resource for handling the read-triggering request or the at least one read response depending on the relative data width indication for the source ingress port and the selected egress port.

17. The method of claim 15, wherein when at least one of the subset of ports is to receive read responses having a narrower data width than read responses to be provided to the requesting node by the given ingress port, the electronic design file is generated or updated to indicate that the given ingress port comprises response assembly circuitry to assemble a combined response having a wider data width from a plurality of read responses received from said at least one of the subset of ports.

18. The method of claim 17, wherein when none of the subset of ports is to receive read responses having a narrower data width than read responses to be provided to the requesting node by the given ingress port, the electronic design file is generated or updated to indicate that the response assembly circuitry should be omitted from the given ingress port.

19. The method of claim 17, wherein the response assembly circuitry is capable of assembling the combined response based on a read response stored in a first portion of a read response buffer, and incapable of assembling the combined response based on a read response stored in a second portion of the read response buffer, and the method comprises determining a relative size of the first portion and the second portion of the read response buffer based on an indication of required traffic patterns for the interconnect.

20. The method of claim 15, wherein the method comprises selecting an arrangement of routers for connecting the plurality of ports within the interconnect, depending on design specification data specifying at least one of physical position of the plurality of ports and expected usage requirements for the plurality of ports, and generating or updating the electronic design file to indicate that the interconnect comprises the selected arrangement of routers.

21. A non-transitory storage medium storing a computer program for controlling a data processing apparatus to perform the method of claim 15.

* * * * *